B. S. ROY.
CARD-GRINDING MACHINE.
No. 173,672. Patented Feb. 15, 1876.
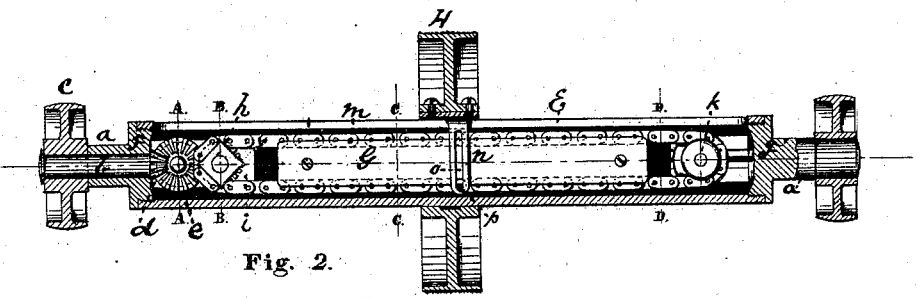
Fig. 2.
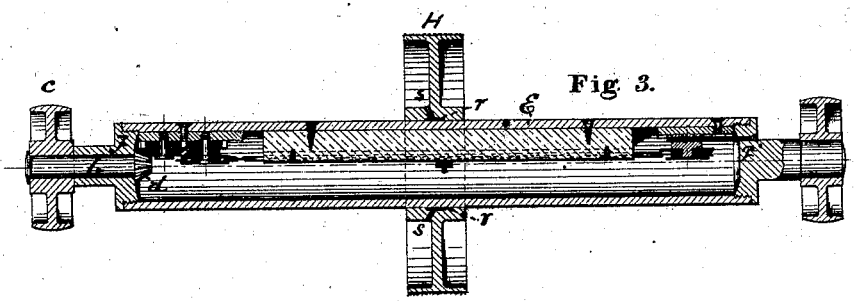
Fig. 3.
  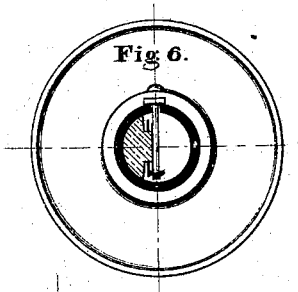 
Fig. 4. Fig. 5. Fig. 6. Fig. 7.
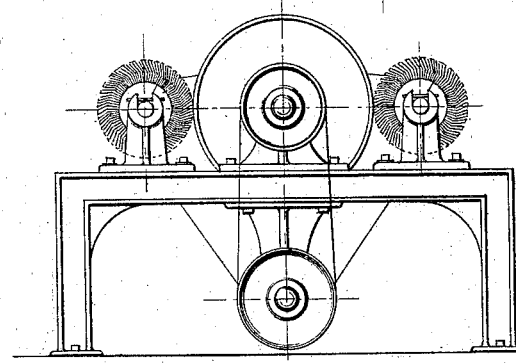
Fig. 1.
WITNESSES. INVENTOR.

UNITED STATES PATENT OFFICE.

BOZIL S. ROY, OF ROCKVILLE, CONNECTICUT, ASSIGNOR OF ONE-HALF HIS RIGHT TO EDWARD C. CLARKE, OF SAME PLACE.

IMPROVEMENT IN CARD-GRINDING MACHINES.

Specification forming part of Letters Patent No. 173,672, dated February 15, 1876; application filed September 15, 1875.

*To all whom it may concern:*

Be it known that I, BOZIL S. ROY, of St. Phillip, in the Dominion of Canada, but now residing at Rockville, in the State of Connecticut, have invented certain new and useful Improvements in Card-Grinders; and I do hereby declare that the following specification, taken in connection with the drawings making a part of the same, is a full, clear, and exact description thereof.

Figure 1 is an end view. Fig. 2 is a longitudinal section. Fig. 3 is another longitudinal section upon a different plan. Figs. 4, 5, 6, and 7 are transverse sections through the planes A A, B B, C C, and D D, respectively.

The machine hereinafter described, although employing the same general principle or mode of operation, is an improvement in various particulars upon the card-grinder for which Letters Patent of the United States, No. 81,213, were granted to myself and to Henry S. Morse, dated August 18, 1868.

Referring to the drawings, E is a hollow cylindrical shaft or tube, through whose side is cut a narrow slot, $x$, Figs. 4, 5, and 7, the length of which is equal to the extent of traverse which is to be given to the grinding-wheel. The ends of this hollow shaft are to be closed by heads F F', to which heads are attached journals $a$ $a'$ for supporting the shaft and its grinding-wheel in suitable stands. The journal F is made hollow, so as to furnish a bearing for a short shaft, $b$, to which, at the outer end, a driving-pulley, $c$, is keyed. The end of this short shaft $b$ is terminated by a bevel-gear wheel, $d$, the teeth of which engage with the teeth of a larger bevel-gear wheel, $e$, Fig. 2. This bevel-gear wheel $e$ has attached to its back a toothed wheel, $f$, Fig. 4, and this latter engages with the teeth of a similar toothed wheel, $g$, Fig. 5, and upon the hub of wheel $g$ a chain or sprocket-wheel, $h$, Figs. 2 and 5, is secured. These wheels $e f$ and $g h$ are mounted on stud-pins on the face of a block, $i$, constituting a section of a solid cylinder, having its front face a plane, and which is secured by screws to the inner surface of the hollow shaft E. At the opposite end of the hollow shaft E is similarly mounted, Figs. 2 and 7, another chain-wheel, $k$. Around these chain-wheels $h$ and $k$ an endless chain, $m$, passes, as shown clearly at Fig. 2, and it is obvious that when motion is given to the driving bevel-gear wheel $d$, by means of a belt passing around the pulley $c$, the chain $m$ will be made to travel in an endless path.

To give support to the chain, and confine it to a fixed plane of movement, a guide, G, having grooved or channeled edges, is secured to the inner wall of the hollow shaft F, as shown at Fig. 2. H is a grinding-wheel, which is combined with the endless chain $m$ by means of the simple device of an arm, $n$, which is secured to the hub of the grinding-wheel and projects into the hollow shaft E through the slot $x$. This arm has a slot, $o$, cut through it, the length of which is somewhat greater than the diameter of the chain-wheels, and into this slot a joint-pin, $p$, projecting from the side of some one of the links which make up the chain $m$, is entered. It follows that, as the chain travels, the grinding-wheel will be made to traverse the shaft, the length of the slot $o$ in the arm $n$ being sufficient to enable the pin $p$ to be accommodated to its changes in position as it passes from a lower to a higher plane, or vice versa in traveling around the chain-wheels.

In order to lubricate the hub of the grinding-wheel properly and uniformly, I make an annular recess, $r$, around the inner surface of the hub, and connect with it one or more passages, $s$, Fig. 3, leading to the outside of the hub. The annular recess in the hub should be filled with felt, or some suitable fibrous absorbent. Oil supplied through the ducts $s$ will be taken up by such absorbent, and be uniformly distributed upon the surface of the shaft E as the grinding-wheel traverses the same. The shaft E and the grinding-wheel are revolved by means of a belt applied to the pulley F', and the apparatus is to be used for grinding the teeth of carding-cylinders in the same manner as similar machines are now used.

What I claim as my invention, and desire to secure by Letters Patent, is—

1. The combination of the hollow shaft E, provided with an internal chain-gear, as described, with the grinding-wheel H, by means of the slotted-arm connection n, whereby the said grinding-wheel is made to traverse the shaft by the movement of the chain-gear, substantially as described.

2. The combination, with a grinding-wheel, arranged to revolve with a driving-shaft, and to move to and fro longitudinally thereon, of an annular oil-chamber in the hub of the wheel, encircling the driving-shaft and communicating therewith, substantially as described, whereby the entire contact-surfaces of wheel and shaft are lubricated with uniformity, as set forth.

BOZIL S. ROY.

Witnesses:
E. C. CLARK,
CHAS. E. CLARK.